United States Patent
Oplawski et al.

(10) Patent No.: US 11,921,526 B2
(45) Date of Patent: Mar. 5, 2024

(54) METHOD AND SYSTEM FOR CONTROLLING AN ELECTRIC HEATER USING CONTROL ON ENERGY

(71) Applicant: Watlow Electric Manufacturing Company, St. Louis, MO (US)

(72) Inventors: Andrew Oplawski, St. Louis, MO (US); Jeremy Quandt, Winona, MN (US); Keith Ness, St. Louis, MO (US); Jacob Lindley, St. Louis, MO (US)

(73) Assignee: WATLOW ELECTRIC MANUFACTURING COMPANY, St. Louis, MO (US)

( * ) Notice: Subject to any disclaimer, the term of this patent is extended or adjusted under 35 U.S.C. 154(b) by 75 days.

(21) Appl. No.: 17/465,441

(22) Filed: Sep. 2, 2021

(65) Prior Publication Data

US 2022/0075399 A1    Mar. 10, 2022

Related U.S. Application Data

(60) Provisional application No. 63/074,520, filed on Sep. 4, 2020.

(51) Int. Cl.
*G05D 23/19* (2006.01)
*G05B 19/4155* (2006.01)
*H05B 1/02* (2006.01)

(52) U.S. Cl.
CPC ..... *G05D 23/1902* (2013.01); *G05B 19/4155* (2013.01); *H05B 1/0288* (2013.01);
(Continued)

(58) Field of Classification Search
CPC ............ G05D 23/1902; G05B 19/4155; G05B 2219/42033; G05B 2219/50333; H05B 1/0288; H05B 1/0227
See application file for complete search history.

(56) References Cited

U.S. PATENT DOCUMENTS 5,397,515 A * 3/1995 Searle .................... B29C 45/78
700/202
5,703,342 A * 12/1997 Hoffmann .......... G05D 23/1917
374/103
(Continued)

FOREIGN PATENT DOCUMENTS

CN 101801625 A 8/2010
CN 103792973 A 5/2014
(Continued)

OTHER PUBLICATIONS

Search Report issued in corresponding TW Application No. 110132897, dated Jun. 2, 2022, 2 pages.
(Continued)

*Primary Examiner* — Kenneth M Lo
*Assistant Examiner* — Jonathan Michael Skrzycki
(74) *Attorney, Agent, or Firm* — Burris Law, PLLC

(57) ABSTRACT

A method for controlling a heated process of an electric heater includes obtaining a setpoint variable indicating a target temperature of the heater. The method includes identifying an energy profile for the heater based on the setpoint variable. The energy profile provides a defined magnitude of initial electrical energy to be applied to the heater to have a temperature of the heated process reach the target temperature. The method includes obtaining a process variable indicating a performance characteristic of the heated process. The method includes providing electrical energy to the heater based on at least one of the energy profile and the process variable.

20 Claims, 6 Drawing Sheets

(52) U.S. Cl.
CPC .............. *G05B 2219/42033* (2013.01); *G05B 2219/50333* (2013.01)

(56) References Cited

U.S. PATENT DOCUMENTS

| | | | |
|---|---|---|---|
| 11,545,375 B2 | 1/2023 | Strassner et al. | |
| 2004/0060917 A1 | 4/2004 | Liu et al. | |
| 2004/0230325 A1* | 11/2004 | Ramamoorthy | G05B 13/042 700/37 |
| 2005/0109767 A1 | 5/2005 | Fennewald et al. | |
| 2007/0251939 A1* | 11/2007 | Minkovich | H01L 21/67225 219/505 |
| 2009/0177310 A1* | 7/2009 | Dao | H01L 21/67098 700/121 |
| 2011/0118856 A1* | 5/2011 | Brudevold | G05B 11/36 700/43 |
| 2013/0051777 A1 | 2/2013 | Brian et al. | |
| 2013/0134150 A1* | 5/2013 | Mizuno | B60N 2/5685 219/202 |
| 2017/0074533 A1* | 3/2017 | Ji | F24F 11/30 |
| 2017/0082683 A1 | 3/2017 | Krystad et al. | |
| 2020/0094494 A1 | 3/2020 | Johnson et al. | |

FOREIGN PATENT DOCUMENTS

| | | |
|---|---|---|
| CN | 105393182 A | 3/2016 |
| CN | 108702818 A | 10/2018 |
| CN | 109964082 A | 7/2019 |
| TW | 200741882 A | 11/2007 |
| TW | 201537804 A | 10/2015 |
| TW | 202027192 A | 7/2020 |

OTHER PUBLICATIONS

International Search Report for corresponding International Application No. PCT/US2021/048884, dated Nov. 30, 2021, 10 pages.

* cited by examiner

METHOD AND SYSTEM FOR CONTROLLING AN ELECTRIC HEATER USING CONTROL ON ENERGY

CROSS-REFERENCE TO RELATED APPLICATIONS

This application claims priority to and the benefit of U.S. Provisional Application 63/074,520 filed on Sep. 4, 2020. The disclosure of the above application is incorporated herein by reference.

FIELD

The present disclosure relates to a method for controlling the thermal performance of an electric heater.

BACKGROUND

The statements in this section merely provide background information related to the present disclosure and may not constitute prior art.

A thermal system for an industrial process typically includes a heater system and a control system to monitor and control the operations of the heater system. The control system may be a temperature proportional-integral-derivative (PID) control system configured to control a temperature of the heater system to a target temperature. However, temperature PID controllers react to thermal system changes once a temperature sensor detects a change in measured temperature. As such, it may be difficult for the temperature PID controller to quickly and timely react to thermal system changes, such as a thermal load change.

SUMMARY

This section provides a general summary of the disclosure and is not a comprehensive disclosure of its full scope or all of its features.

The present disclosure provides a method for controlling a heated process of a heater. The method includes obtaining a setpoint variable indicating a target temperature of the heater. The method includes identifying an energy profile for the heater based on the setpoint variable, where the energy profile provides a defined magnitude of initial electrical energy to be applied to the heater to have a temperature of the heated process reach the target temperature. The method includes obtaining a process variable indicating a performance characteristic of the heated process. The method includes providing electrical energy to the heater based on at least one of the energy profile and the process variable.

In some forms, providing the electrical energy to the heater further includes providing the defined magnitude of initial electrical energy to the heater. In some forms, providing the electrical energy to the heater further includes reducing the electrical energy to the heater in response to the process variable indicating that the temperature of the heater is within a temperature approach band of the target temperature of the heater, where the performance characteristic includes the temperature of the heater. In some forms, the electrical energy is reduced to a steady state electrical power based on a natural time constant. In some forms, the electrical energy is reduced to a steady state electrical power based on a proportional-integral control.

In some forms, the method further includes determining whether the temperature of the heater is less than the setpoint variable. In response to the temperature of the heater being less than the setpoint variable, the electrical energy provided to the heater is based on the identified energy profile and is equal to the defined magnitude of initial electrical energy. In response to the temperature of the heater being greater than the setpoint variable, the method further includes turning-off electrical energy to the heater, and obtaining the process variable indicating the performance characteristic of the heater, where the performance characteristic includes the temperature of the heater. In some forms, in response to the temperature of the heater being greater than the setpoint variable, the method further includes increasing the electrical energy to the heater to a steady state electrical power in response to the temperature of the heater approaching the setpoint variable. In some forms, the electrical energy is increased from zero to the steady state electrical power based on a natural time constant. In some forms, the electrical energy is increased from zero to the steady state electrical power based on a proportional-integral control.

In some forms, the method further includes determining whether the temperature of the heater is equal to the setpoint variable. In some forms, the method further includes controlling the electrical energy to the heater based on a temperature control model for maintaining the temperature of the heater at the setpoint variable. In some forms, the performance characteristic includes at least one of a voltage of the heater, a current of the heater, and a temperature of the heater.

The present disclosure provides a system for controlling a heater. The system includes a processor configured to execute instructions stored in a nontransitory computer-readable medium. The instructions include obtaining a target temperature of the heater and a temperature of the heater, controlling the heater in one of an energy-based control mode and a temperature control mode based on the target temperature and the temperature, and identifying, during the energy-based control mode, an energy profile for the heater based on the target temperature, where the energy profile provides a defined magnitude of initial electrical energy to be applied to the heater to have the temperature reach the target temperature. The method includes providing, during the energy-based control mode, electrical energy to the heater based on the energy profile, and selectively providing, during the temperature control mode, the electrical energy to the heater based on the temperature.

In one form, the instructions for providing, during the energy-based control mode, the electrical energy to the heater based on the energy profile further include providing the defined magnitude of initial electrical energy to the heater, determining whether the temperature of the heater is within a temperature approach band of the target temperature of the heater, reducing the electrical energy provided to the heater to a steady state electrical power in response to the temperature of the heater being within the temperature approach band of the target temperature of the heater. In one form, the instructions for selectively providing, during the temperature control mode, the electrical energy to the heater based on the temperature further include turning off electrical energy to the heater, determining whether the temperature of the heater is within a temperature approach band of the target temperature of the heater, and increasing the electrical energy provided to the heater to a steady state electrical power in response to the temperature of the heater being within the temperature approach band of the target temperature of the heater.

In one form, the instructions further include determining whether the temperature of the heater is equal to the target temperature and controlling the electrical energy provided to the heater based on a temperature control model for maintaining the temperature of the heater in response to the temperature of the heater being equal to the target temperature.

The present disclosure provides a method for learning an energy profile of a heater. The method includes obtaining a setpoint variable indicating a target temperature of the heater and providing electrical energy to the heater, where the electrical energy has a calibration magnitude. The method includes obtaining a process variable indicating a temperature of the heater. When the process variable indicates that the temperature of the heater is equal to the target temperature, the method includes determining a response time of the heater, selectively adjusting gain values based on the response time, and generating an energy profile based on the gain values of the controller and the setpoint variable, where the energy profile correlates the setpoint variable to a predetermined value of electrical energy.

In one form, the energy profile further defines a steady state electrical power that is applied to the heater in response to the temperature of the heater being within a temperature approach band of the target temperature. In one form, the method further includes defining the temperature approach band of the target temperature based on a mathematical model. In one form, the energy profile further defines a duration of time to provide the predetermined value of electrical energy to the heater to have the temperature of the heater reach the target temperature. In one form, selectively adjusting the gain values based on the response time further comprises adjusting the gain values based on a Ziegler-Nichols tuning routine in response to the response time being less than a threshold response time. In one form, the energy profile is further based on the calibration magnitude. In one form, the method further includes selectively adjusting the calibration magnitude when the process variable indicates that the temperature of the heater is equal to the target temperature.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
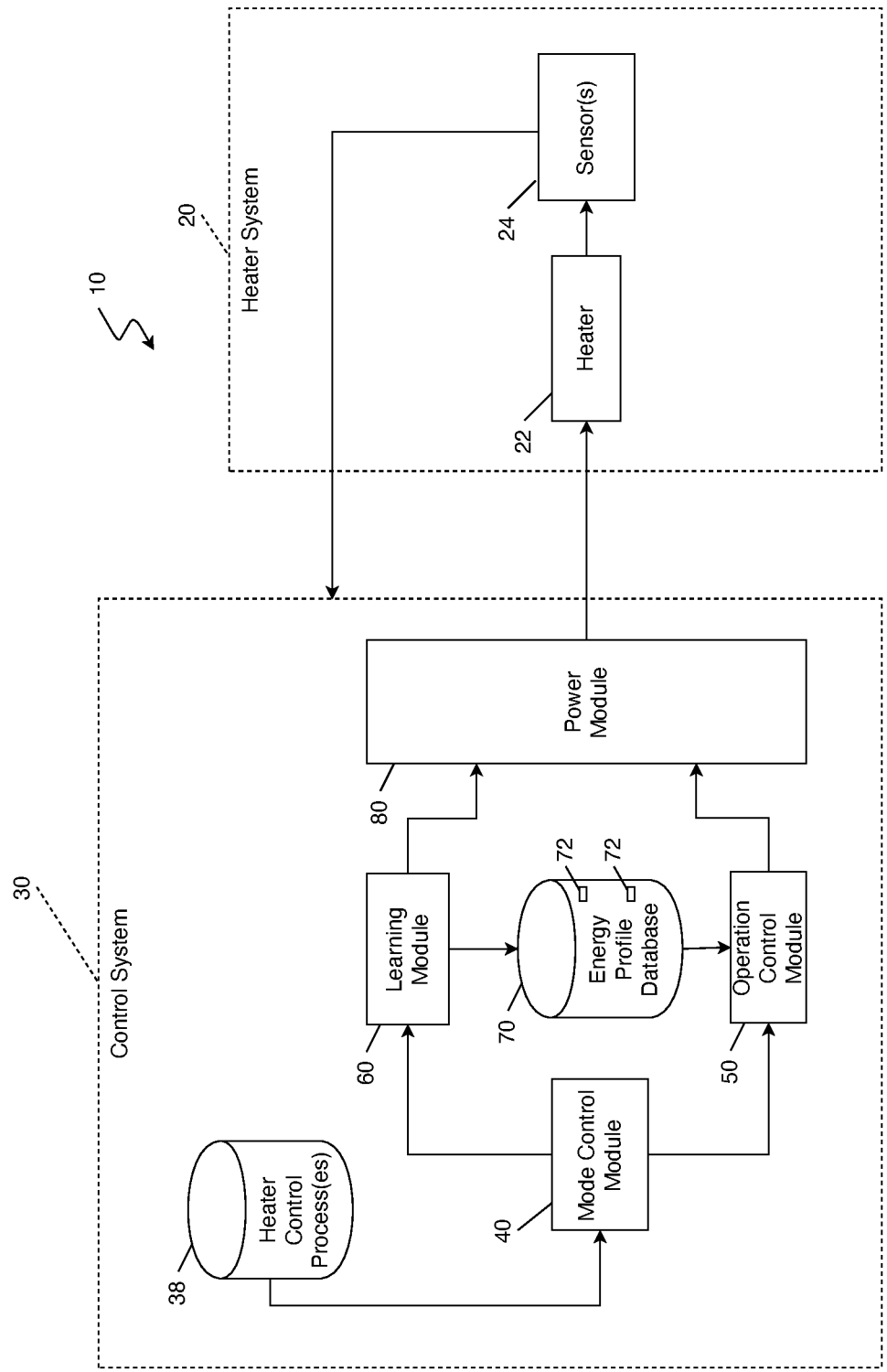
FIG. 1 is a block diagram of a thermal system having an energy control system and a heater system according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a thermal system 10 including a heater system 20 having a heater 22 and a control system 30 configured to provide a desired thermal response is shown. In one form, the control system 30 is configured to control the operation of the heater system 20 and, more particularly, the heater 22.

The thermal system 10 can be part of various types of industrial processes for controlling a thermal characteristic of a load being heated. For example, the thermal system 10 can be part of a semiconductor process in which the heater system 20 includes a pedestal heater for heating a wafer (e.g., a load). In this example, the control system 30 may be configured to control an energy profile of the pedestal heater, which can vary based on different controls. For example, the controls can include, but are not limited to: power provided to the pedestal heater, an operational mode of the thermal system 10 (e.g., a manual mode to control power to the heater 22 based on inputs from a user, a cold-start mode to gradually increase temperature of the pedestal heater, a steady-state mode to maintain the pedestal heater at a target temperature, among other defined operation modes for controlling the heater system 20), and/or operational state of different zones of the pedestal heater when the pedestal heater is a multi-zone heater, among other parameters controllable by the thermal system 10. Furthermore, the controls can include, but are not limited to: the type of wafer being heated, gases being injected into a process chamber having the pedestal heater, and/or a pressure differential within the chamber for securing the wafer to the pedestal heater, among other factors.

In another example, the thermal system 10 can be used in abatement system of the semiconductor process to heat fluid flowing through a network of conduits. In one form, the heater system 20 can include multiple flexible heaters that wrap about the conduits to heat the fluid therein. In yet another example, the thermal system 10 can employ cartridge heaters as part of the heater system 20 to directly heat fluid (e.g., gas and/or liquid) flowing through conduits or provided within a container.

While specific applications of the thermal system 10 are provided herein, the present disclosure may be applicable to other industrial processes having a thermal system to heat a load. Furthermore, the heater 22 of the heater system 20 should not be limited to the examples provided herein, and the heater 22 may include a layered heater, a cartridge heater, a tubular heater, a polymer heater, a flexible heater, among other heaters having a resistive heating element.

The heater system 20 can include one or more sensors 24 for measuring performance characteristics (i.e., a process variable) of the heater 22, such as, but not limited to: a temperature, a voltage, a current, an electrical power, and/or a resistance of the heater 22, among others. Accordingly, the one or more sensors 24 may include a thermocouple, a resistance temperature detector, an infrared camera, a current sensor, and/or a voltage sensor, among others.

In one variation, the heater 22 may generate the performance characteristic in lieu of or in addition to the one or more sensors 24 generating the performance characteristics. As an example, the heater system 20 can be a two-wire heater system, where the heater 22 is operable to generate heat and operate as a sensor to measure a performance characteristic of the heater 22. More particularly, the heater 22 can include one or more resistive heating elements that operate as a sensor for measuring an average temperature of the resistive heating element based on a resistance of the resistive heating element. An example two-wire heater system is disclosed in U.S. Pat. No. 7,196,295, which is commonly owned with the present application and the contents of which are incorporated herein by reference in its entirety. In a two-wire system, the thermal system is an adaptive thermal system that merges heater designs with controls that incorporate power, resistance, voltage, and current in a customizable feedback control system that limits one or more these parameters (i.e., power, resistance, voltage, and current) while controlling another. In one form, the control system 30 is configured to monitor at least one of current, voltage, and power delivered to the resistive heating element to determine resistance, and thus, temperature of the resistive heating element.

In another variation, as a two-wire heater, the heater 22 is configured to include temperature sensing power pins for measuring a temperature of the heater 22. Using the power pins as a thermocouple to measure a temperature of a resistive heating element is disclosed in U.S. Pat. No. 10,728,956, which is commonly owned with the present application and the contents of which are incorporated herein by reference in its entirety. Generally, the resistive heating element of the heater 22 and the control system 30 are connected via a first power pin and a second power pin that define a first junction and a second junction, respectively. The first and second power pins function as thermocouple sensing pins for measuring temperature of the resistive heating element of the heater 22. The control system 30, which is in communication with the first and second power pins, may be configured to measure changes in voltage at the first and second junctions. More specifically, the control system 30 may measure millivolt (mV) changes at the junctions and then uses these changes in voltage to calculate a temperature of the resistive heating element.

The control system 30 is configured to control the heater system 20 based on an energy profile that defines an output control for controlling the heater system 20. The output control can be provided in various suitable forms, such as a percent of input power (e.g., 75% input power) and/or an actual voltage level, among others. Furthermore, the control system 30 is configured to define one or more energy profiles that are utilized to control the heater system 20.

In one form, the control system 30 includes a heater control process database 38, a mode control module 40, an operation control module 50, a learning module 60, an energy profile database 70, and a power module 80. In order to perform the functionality described herein, the control system 30 may be implemented by a microcontroller that includes one or more processor circuits configured to execute machine-readable instructions stored in one or more nontransitory computer-readable mediums, such as a random-access memory (RAM) circuit and/or a read-only memory (ROM) circuit. While the heater control process database 38, the mode control module 40, the operation control module 50, the learning module 60, the energy profile database 70, and the power module 80 are shown as part of the control system 30, it should be understood that any one of these components may be located on separate controller(s) communicably coupled to the control system 30.

In some forms, the control system 30 includes one or more defined control processes stored in the heater control process database 38 that, when executed by the control system 30, controls the thermal performance of the heater 22. A given control process may define one or more target temperatures for the heater 22, a process timeline indicating the time and duration of the target temperature(s), and/or a control mode for the control system 30, among other parameters. In one form, a user may select the control process to be performed via an external device, such as a human machine interface (HMI).

In some forms, the mode control module 40 is configured to obtain a target temperature and set a control mode of the control system 30. As an example, the mode control module 40 is configured to set the energy control mode to an energy profile learning mode provided by the learning module 60 and/or an operation control mode provided by the operation control module 50. In one form, the energy control mode is set by the user by way of an external device. For example, the user may have the control system 30 operate in the energy profile learning mode to define one or more energy profiles based on one or parameters set by the user and/or defined in a prestored control process. In another form, the energy control mode is automatically set based on the control process to be executed by the control system 30. For example, the control process is configured to identify the control mode, the target temperature(s), and timeline for controlling the heater at the target temperature(s). In another example, the energy control mode is automatically set to the operation control mode once the learning module 60 completes an energy profile learning routine, which is described below in further detail with reference to FIGS. 3 and 6.

In some forms, the operation control module 50 is configured to perform the control process(es) to determine the output control based on the target temperature and a process variable indicative of a measurable performance characteristic of the heater system 20 (e.g., the temperature measurement from the one or more sensors 24). The functionality of the operation control module 50 is described below in further detail with reference to FIGS. 2 and 4-5.

In some forms, the learning module 60 is configured to generate and store one or more energy profiles 72 in the energy profile database 70. In some forms, the energy profile 72 correlates a target temperature to a defined magnitude of initial electrical power and/or energy to be applied to the heater 22 to have a temperature of the heater 22 reach the target temperature. The energy profile 72 may also define a steady state voltage that is applied to the heater 22 in response to the temperature of the heater 22 being within a defined temperature approach band of the target temperature of the heater 22 to provide a transitional control of the heater 22 to the target temperature, thereby reducing or inhibiting an overshoot of the target temperature. In some forms, the temperature approach band (e.g., a deviation from the target temperature represented as a temperature threshold tolerance) is unique among each of the energy profiles 72. In one variation, the temperature approach band is equal for each of the energy profiles 72. In some forms, the temperature approach band is defined by a user, a mathematical model, and/or a learning routine, among others. In another form, the temperature approach band of the energy profiles 72 may be dynamically updated based on various conditions of the thermal system 10.

In an example application, both the operation control mode and the learning mode may be selected to perform a selected control process. In such application, the operation control module 50 operates the heater 22 as provided below to control the thermal performance of the heater 22, and the learning module 60 is configured to define an energy profile 72 for the control process being performed. Accordingly, the defined energy profile 72 takes into consideration known and unknown parameters of the industrial process having the thermal system 10. For example, in a semiconductor process, the known and unknown parameters may include mass of the load (e.g., wafer), insertion/removal of fluid/powder, and/or opening/closing of valves/doors.

The power module 80 is configured to control the electrical energy provided to the heater system 20 based on the output control from one of the operation control module 50 and the learning module 60. In one form, the power module 80 is electrically coupled to a power source (not shown) and may include a power regulator circuit (not shown) to adjust the power from the power source to a selected power level and apply the adjusted power to the heater 22. Using predefined algorithms and/or a table, the power module 80 is configured to select a power level for the heater system 20 based on the output control.

Figure 2:
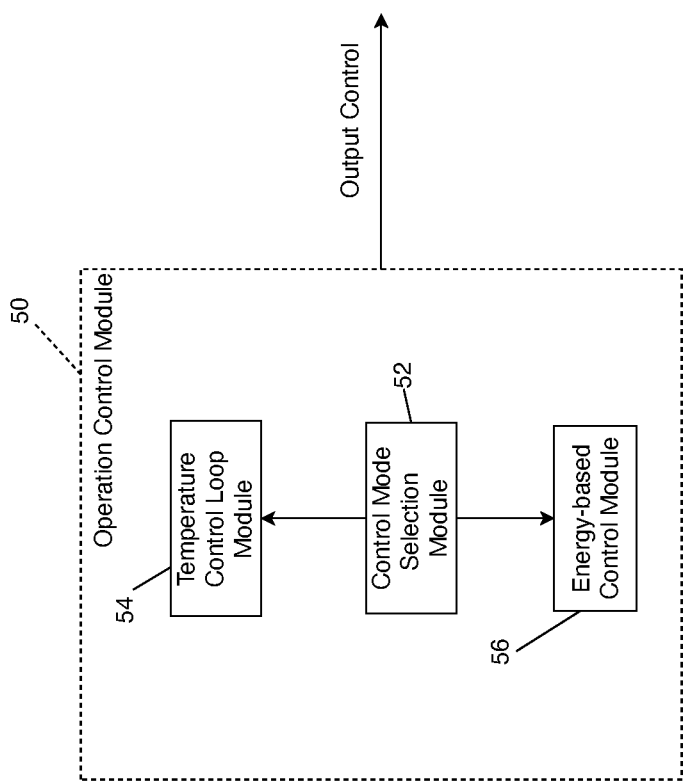
FIG. 2 is a block diagram of an operation control module of an energy control system according to the present disclosure.

Referring to FIG. 2, an example block diagram of the operation control module 50 is shown. In some forms, the operation control module 50 includes a control mode selection module 52, a temperature control loop module 54, and an energy-based control module 56. The control mode selection module 52 is configured to set the operation control mode as one of an energy-based control mode or a temperature control mode based on the target temperature and the process variable from the one or more sensors 24. In one form, the control mode selection module 52 sets the operation control mode to the energy-based control mode and is thereby controlled by the energy-based control module 56 when the target temperature is greater than the measured temperature of the heater. On the other hand, when the target temperature is less than or equal to the measured temperature of the heater 22, the control mode selection module 52 sets the operation control mode to the temperature control mode and is thereby controlled by the temperature control loop module 54. In one variation, the control mode selection module 52 sets the operation control mode to the energy-based control mode when the measured temperature is less than the target temperature by a defined deviation (e.g., a deviation of 10° C., 15° C., or other suitable value). Otherwise, the temperature control mode is selected when the measured temperature is greater than the target temperature by the defined deviation.

During the energy-based control mode, the energy-based control module 56 is configured to control the heater 22 based on the target temperature and a defined energy profile for the target temperature and/or the control process. More particularly, when the temperature of the heater 22 is outside of the temperature approach band of the target temperature, the energy-based control module 56 is configured to provide a defined magnitude of initial electrical power and/or energy to the heater 22 based on the target temperature.

As an example, the energy-based control module 56 identifies an energy profile 72 from among the energy profiles 72 stored in the database 70 based on the control process being performed, the target temperature (e.g., target temperature of 200° C.), and/or the measured temperature of the heater. The identified energy profile 72 provides a defined magnitude of initial electrical energy and/or power to be applied to the heater 22 to have a current temperature of the heater 22 reach the target temperature (e.g., the identified energy profile 72 indicates that 12,500 Watt-seconds (Ws) of electrical energy needs to be applied to the heater 22 to reach a target temperature of 200° C. from the current measured temperature). Subsequently, the energy-based control module 56 provides an output control to the power module 80 such that the defined magnitude of initial electrical energy and/or power is provided to the heater 22.

The defined magnitude of initial electrical energy and/or power is provided to the heater 22 until the temperature of the heater 22 is within the temperature approach band. As an example, the energy-based control module 56 monitors the temperature of the heater 22 to determine if the temperature is within the temperature approach band. Once the temperature of the heater 22, as indicated by the process variable, is within the temperature approach band, the energy-based control module 56 provides a steady state magnitude of electrical power associated with the identified energy profile 72 to the heater 22 (e.g., the identified energy profile 72 indicates that the steady state magnitude of electrical power is 1,500 Watts at 200° C.). The steady state magnitude of electrical power may be based on a natural time constant, an overshoot magnitude, a response time, and/or a steady state error of the energy-based control module 56. In some forms, the steady state magnitude of electrical power may be based on a proportional-integral (PI) control routine implemented by the energy-based control module 56.

Once the temperature of the heater 22 reaches the target temperature, the operation control module 50 transitions to the temperature control mode. During the temperature control mode, the temperature control loop module 54 is configured to control the heater 22 based on the target temperature and the process variables, such as the temperature of the heater 22. For example, in one form, the temperature control loop module 54 performs a PID control that monitors the temperature of the heater 22 and determines the difference between the actual temperature and the target temperature. The temperature control loop module 54 then determines the level of electrical energy needed for reducing the difference between the actual temperature of the heater 22 and the target temperature, as the output control.

By selectively designating the operation control mode between the energy-based control mode (i.e., an open-loop control routine) and the temperature control mode (i.e., a closed loop control routine), the control system 30 reduces the response time of the heater 22 to reach the target temperature and to transition between varying target temperatures. In addition, in one form, the operation control module 50 is configured to select a different operation control mode for different operating conditions. For example, when the temperature of the heater system 20 is stable, the operation control module 50 selects the temperature control mode to maintain the temperature at the target temperature. During dynamic conditions, the operation control module 50 selects the energy-based control to optimize the response while monitoring the temperature of the heater system 20.

Figure 3:
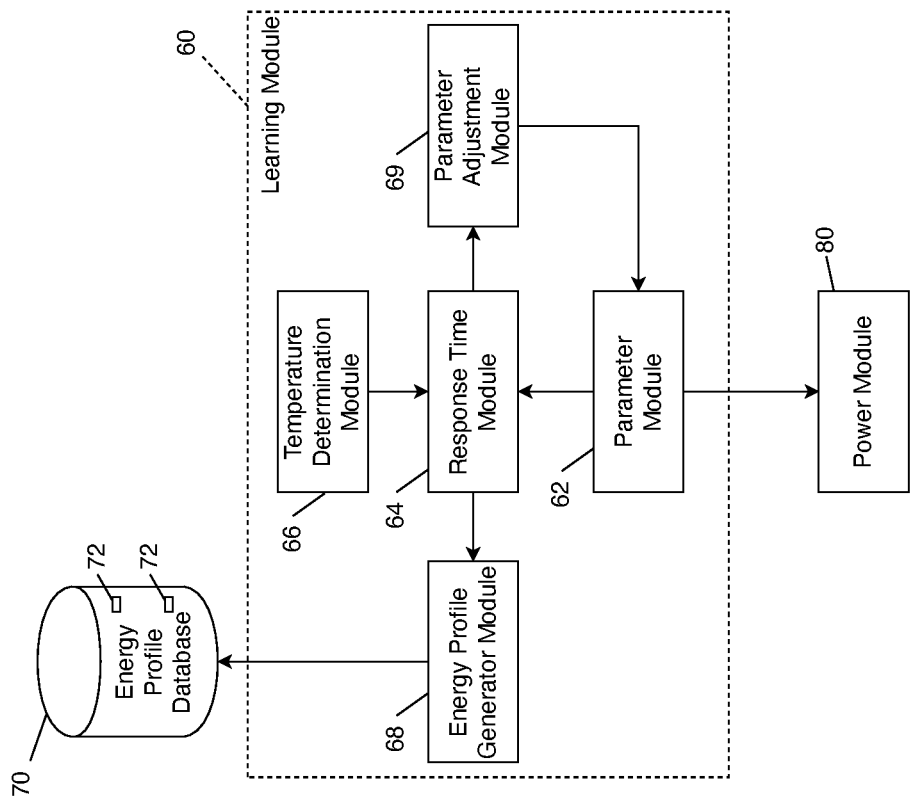
FIG. 3 is a block diagram of a learning module of an energy control system according to the present disclosure.

With reference to FIG. 3, an example block diagram of the learning module 60 is shown. In some forms, the learning module 60 includes a parameter module 62, a response time module 64, a temperature determination module 66, an energy profile generator module 68, and a parameter adjustment module 69. The learning module 60, which may be implemented by a PID control module, is configured to execute an energy profile learning routine when the mode control module 40 sets the control system 30 to the energy profile learning mode.

The learning module 60 may execute the energy profile learning routine periodically to define the energy profiles 72. In some forms, the learning module 60 may execute the energy profile learning routine in conjunction with the operation control routine executed by the operation control module 50, thereby enabling the control system 30 to identify various conditions of the thermal system 10, such as energy consumption, heater or sensor failure, changes in heat transfer, among other conditions of the thermal system 10.

In some forms, the learning module 60 is configured to generate an energy profile 72 for a range of setpoint/target temperatures while executing the energy profile learning routine (e.g., the learning module 60 is configured to generate an energy profile 72 for a plurality of target temperature between −10° C. and 250° C., including endpoints). In some forms, the energy profile 72 correlates a target temperature to a defined magnitude of initial electrical energy and/or power to be applied to the heater 22 and/or a duration of time to provide the electrical energy to have a temperature of the heater 22 reach the target temperature. The energy profile 72 may also define a steady state voltage magnitude of the electrical energy that is applied to the heater 22 in response to the process variable indicating that the temperature of the heater 22 is within a temperature approach band of the target temperature of the heater 22. In some forms, during the energy profile learning routine, the temperature approach band for each energy profile 72 is also defined by, for example, a user, a mathematical model, and/or a learning routine, among others.

During the energy profile learning routine, the parameter module 62 is configured to obtain a setpoint variable indicating a target temperature of the heater 22 (e.g., 200° C.) and provides an output control such that the power module 80 outputs electrical energy having a calibration magnitude (e.g., 10,500 Ws) to the heater 22. Furthermore, the parameter module 62 is configured to designate a set of gain values for evaluating and controlling the heater 22 during the energy profile learning routine (i.e., the parameter module 62 defines at least one of proportional gain values, integral gain values, and/or derivative gain values of the learning module 60). The set of gain values may be determined using, for example, the Ziegler-Nichols tuning method.

While the electrical energy is provided to the heater 22, the temperature determination module 66 is configured to determine the temperature of the heater based on the performance characteristic of the heater 22, as the process variable. Furthermore, while the electrical energy is provided to the heater 22, the response time module 64 is activated and is configured to increment a corresponding value proportional to an amount of elapsed time. When the temperature of the heater 22 is equal to the target temperature, the response time module 64 is configured to determine a response time of the heater 22. As used herein, the "response time of the heater 22" refers to an amount of time needed for the heater 22 to reach the target temperature after obtaining the setpoint variable. In some forms, the response time of the heater 22 may be based on gain values of the learning module 60 (e.g., proportional gain values, integral gain values, and/or derivative gain values).

The energy profile generator module 68 is configured to generate the energy profile 72 based on the gain values, the target temperature, the calibration magnitude, and the response time of the heater 22. As an example, if the response time of the heater 22 is determined to be sufficient for controlling the heater 22 (i.e., the response time is less than a threshold value), the energy profile generator module 68 generates the energy profile 72 for the corresponding target temperature, and the energy profile 72 correlates the calibration magnitude and the gain values to the particular target temperature. Furthermore, if the response time of the heater 22 is determined to be sufficient for controlling the heater 22, the energy profile generator module 68 may also correlate a steady state magnitude to the particular target temperature, where the steady state magnitude is based on a natural time constant as indicated by the gain values.

As another example, if the response time of the heater 22 is determined to be insufficient for controlling the heater 22 (i.e., the response time is greater than a threshold value), the parameter adjustment module 69 may adjust at least one of the calibration magnitude and the gain values to reduce the response time of the heater 22. In some forms, the parameter adjustment module 69 may selectively adjust the gain values based on the Ziegler-Nichols tuning method. In some forms, the parameter adjustment module 69 may increase the calibration magnitude to reduce the response time of the heater 22. The parameter adjustment module 69 may repeatedly adjust at least one of the calibration magnitude and the gain values until the response time of the heater 22 is determined to be sufficient for controlling the heater 22.

In one form, the learning module 60 of the present disclosure can improve the response of the heater system 20 to recurrent dynamic conditions that may not necessarily require user input. For example, the learning module 60 may perform machine learning routine to predict the occurrence and severity of dynamic conditions and ascertain the control mode and control setting to improve the control system response. Accordingly, the control system 30 can improve and/or maintain performance as components of the thermal system 10 gradually change. Furthermore, data collected and determined by the control system 30 can be provided to the user for additional analytics.

Figure 4:
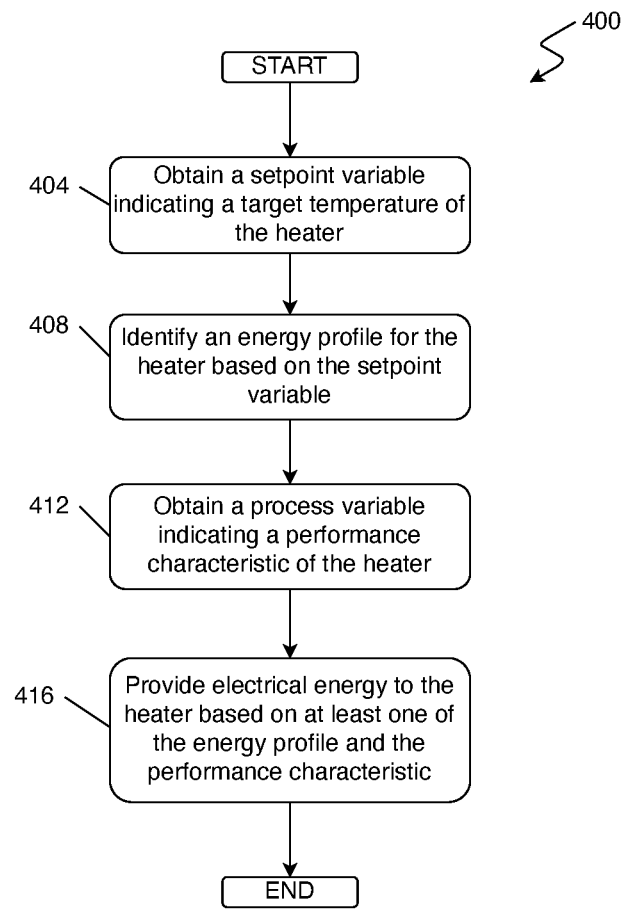
FIG. 4 is a flowchart for controlling a temperature of a heater in a first form according to the present disclosure.

With reference to FIG. 4, a flowchart illustrating an example routine 400 for controlling a temperature of the heater system 20 during the operation control mode is shown. At 404, the control system 30 obtains a setpoint variable indicating a target temperature of the heater 22. In one form, the setpoint variable is provided in a control process to be performed. In another form, the setpoint variable is manually inputted by a user. At 408, the control system 30 identifies an energy profile 72 for the heater 22 based on the setpoint variable. In addition to the setpoint variable, the energy profile 72 may be selected based on the control process and the current temperature of the heater 22. At 412, the control system 30 obtains a process variable indicating a performance characteristic(s) of the heater 22. At 416, the control system 30 provides electrical energy to the heater 22 based on at least one of the energy profile 72 and the performance characteristic.

Figure 5:
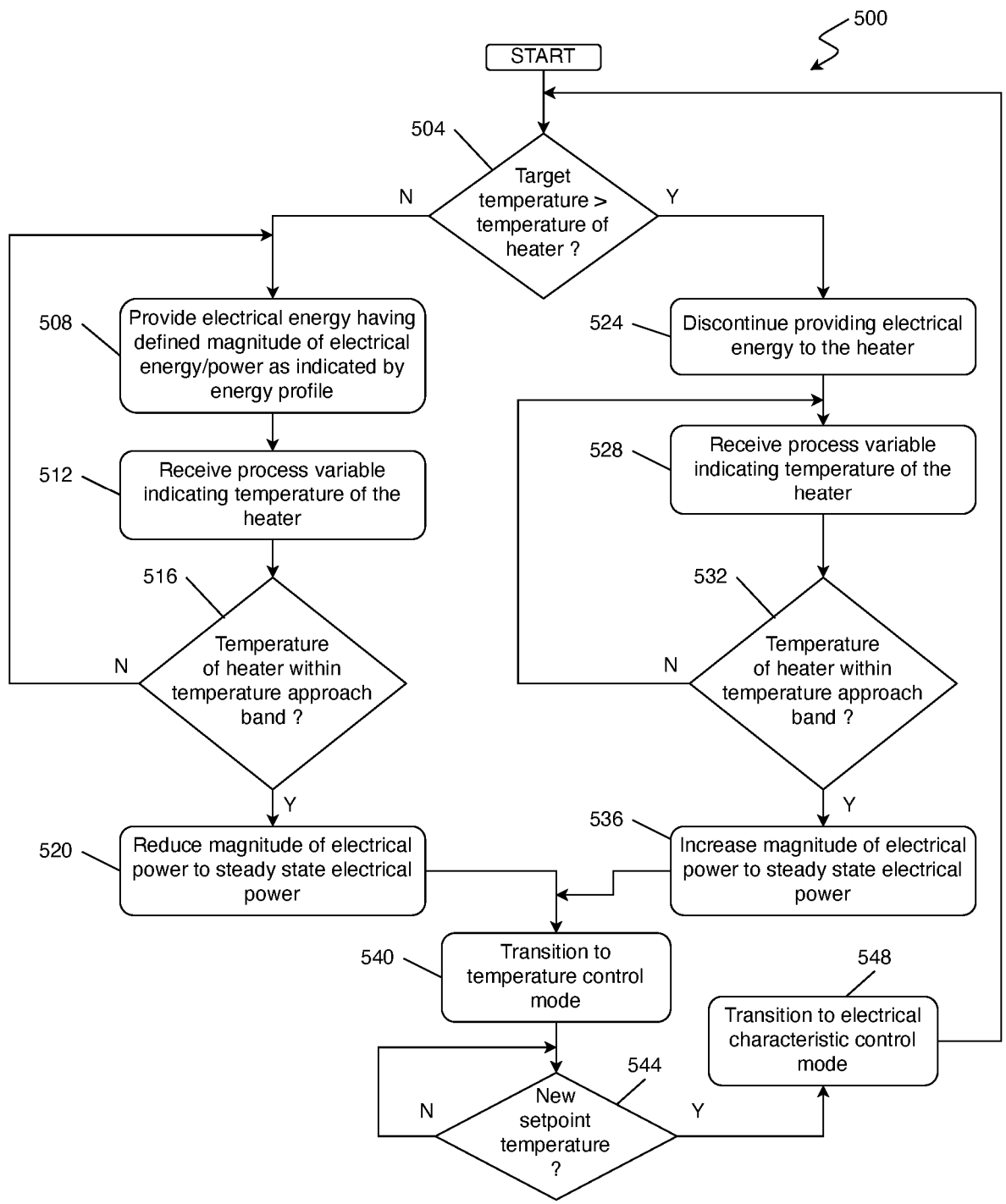
FIG. 5 is another flowchart for controlling a temperature of a heater in a second form according to the present disclosure.

With reference to FIG. 5, a flowchart illustrating another example routine 500 for controlling a temperature of the heater system 20 during the operation control mode is shown. At 504, the control system 30 determines whether a setpoint variable indicating a target temperature of the heater 22 is greater than the temperature of the heater 22. If so, the routine 500 proceeds to 508. Otherwise, if the target temperature of the heater 22 is less than the temperature of the heater 22, the routine 500 proceeds to 524.

At 508, the control system 30 provides electrical energy having a defined magnitude of electrical energy and/or power as provided by the energy profile 72 for the target temperature. At 512, the control system 30 obtains the temperature of the heater 22 as the process variable. At 516, the control system 30 determines whether the temperature of the heater 22 is within the temperature approach band as indicated by the energy profile 72. If so, the routine 500 proceeds to 520. Otherwise, if the temperature of the heater 22 is not within the temperature approach band, the routine 500 proceeds to 508. At 520, the control system 30 reduces the magnitude of electrical power to the steady state magnitude of electrical power as indicated by the energy profile 72 and then proceeds to 540.

At 524 and in response to the setpoint variable indicating the target temperature of the heater 22 is less than the temperature of the heater 22 at 508, the control system 30 discontinues providing electrical energy to the heater 22. At 528, the control system 30 obtains the temperature of the heater 22 as the process variable. At 532, the control system 30 determines whether the temperature of the heater 22 is within the temperature approach band as indicated by the energy profile 72. If so, the routine 500 proceeds to 536. Otherwise, if the temperature of the heater 22 is not within the temperature approach band, the routine 500 proceeds to 528. At 536, the control system 30 increases the magnitude of electrical power to the steady state magnitude of electrical power as indicated by the energy profile 72 (e.g., the magnitude of electrical power is increased from zero to the steady state electrical power based on a proportional-integral control and/or the natural time constant) and then proceeds to 540.

At 540, the control system 30 performs a closed-loop temperature control to control the temperature of the heater at the target temperature as provided above. At 544, the control system 30 determines whether a new target temperature is available. If so, the routine 500 proceeds to 504. Otherwise, the routine 500 remains at 544 until a new target temperature is available.

Figure 6:
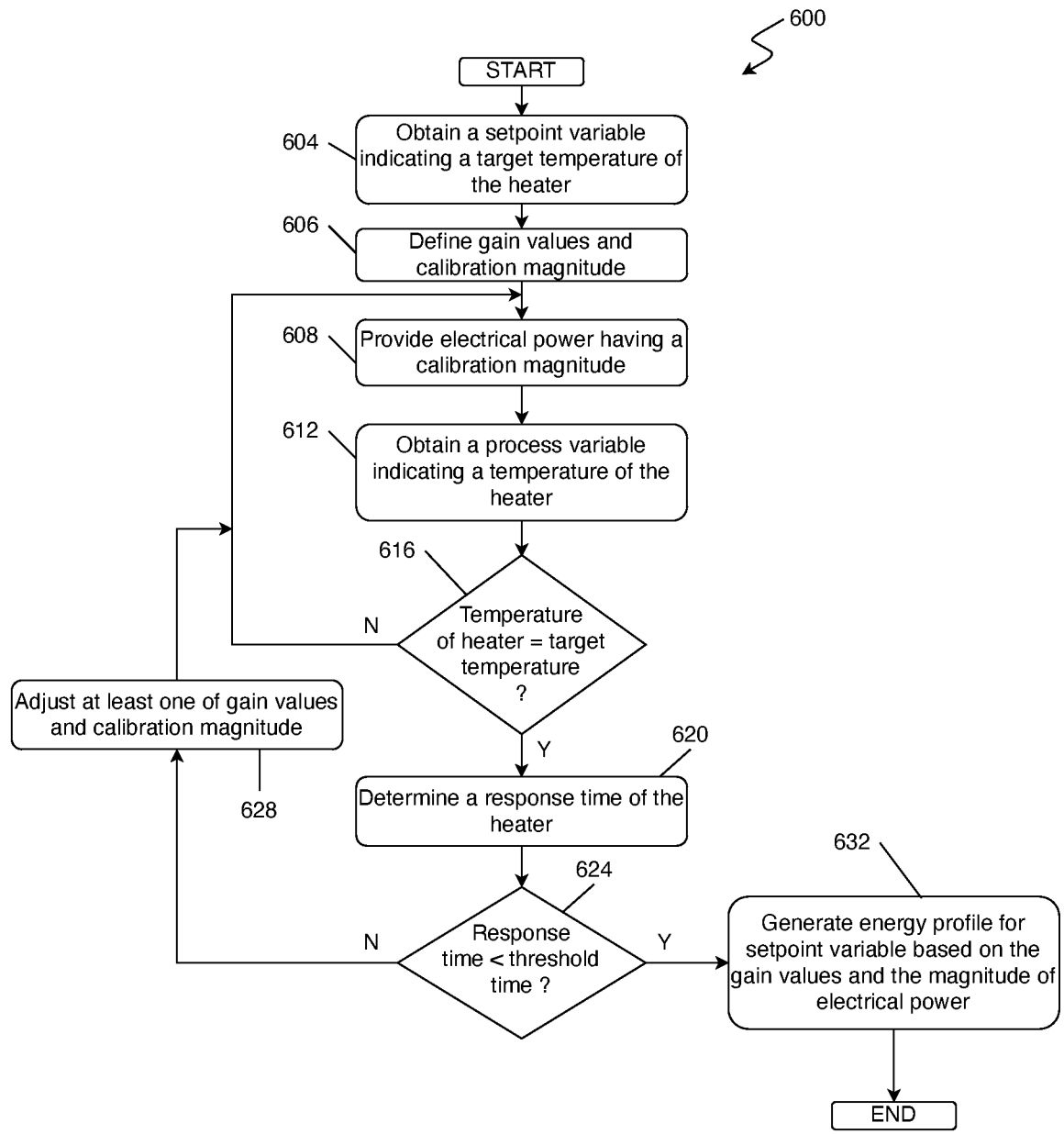
FIG. 6 is a flowchart for learning an energy profile of the thermal system according to the present disclosure.

With reference to FIG. 6, a flowchart of a learning routine 600 executed during the energy profile learning mode and by the control system 30 is shown. At 604, the control system 30 obtains a setpoint variable indicating a target temperature of the heater 22. At 606, the control system 30 defines an initial set of gain values and a calibration magnitude for the particular target temperature. At 608, the control system 30 provides electrical energy having the calibration magnitude to the heater 22. At 612, the control system 30 obtains the temperature of the heater 22 as the process variable. At 616, the control system 30 determines whether the temperature of the heater 22 is equal to the target temperature. If so, the routine 600 proceeds to 620. If the temperature of the heater 22 is not equal to the target temperature at 616, the routine 600 proceeds to 608.

At 620, the control system 30 determines a response time of the heater 22. At 624, the control system 30 determines whether the response time is less than a threshold response time. If so, the routine 600 proceeds to 632, where the control system 30 generates an energy profile 72 for the particular target temperature based on the gain values and the magnitude of electrical energy. If the response time of the heater 22 is greater than the threshold response time at 624, the routine 600 proceeds to 628, where the control system 30 adjusts at least one of the gain values (e.g., using the Ziegler-Nichols tuning method) and the calibration magnitude and then proceeds to 608.

It should be readily understood that routines 400, 500, and 600 are exemplary control routines and that other suitable control routines may be used for performing the operation of the control system of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

Spatial and functional relationships between elements are described using various terms, including "connected," "engaged," "coupled," "adjacent," "next to," "on top of," "above," "below," and "disposed." Unless explicitly being described as being "direct," when a relationship between first and second elements is described in the present disclosure, that relationship can be a direct relationship where no other intervening elements are present between the first and second elements, and can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, the term "module" may be replaced with the term "circuit". The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term code may include software, firmware, and/or microcode, and may refer to programs, routines, functions, classes, data structures, and/or objects. The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for controlling a heated process of a heater, the method comprising:
   obtaining a first setpoint variable indicating a first target temperature of the heater;
   identifying an energy profile for the heater based on the first setpoint variable, wherein the energy profile provides a defined magnitude of initial electrical energy to be applied to the heater to have a temperature of the heated process reach the first target temperature; and
   providing first electrical energy to the heater based on the energy profile, wherein the energy profile is based on:
      obtaining a second setpoint variable indicating a second target temperature of the heater;
      providing second electrical energy to the heater, wherein the second electrical energy has a calibration magnitude;
      obtaining a first process variable indicating a temperature of the heater; and when the first process variable indicates that the temperature of the heater is equal to the first target temperature of the heater or the second target temperature of the heater:
   determining a response time of the heater;
   selectively adjusting gain values of a controller based on the response time; and
   generating the energy profile based on the gain values and the first setpoint variable or the gain values and the second setpoint variable, wherein the energy profile correlates the first setpoint variable to a first predetermined value of the first electrical energy or the energy profile correlates the second setpoint variable to a second predetermined value of the second electrical energy.

2. The method of claim 1, wherein providing the first electrical energy to the heater further comprises:
   providing the defined magnitude of initial electrical energy to the heater;
   obtaining a second process variable indicating a performance characteristic of the heated process; and
   reducing the first electrical energy to the heater in response to the second process variable indicating that the temperature of the heater is within a temperature approach band of the first target temperature of the heater, wherein the performance characteristic comprises the temperature of the heater.

3. The method of claim 2, wherein the first electrical energy is reduced to a steady state electrical power based on a natural time constant.

4. The method of claim 2, wherein the first electrical energy is reduced to a steady state electrical power based on a proportional-integral control.

5. The method of claim 2, wherein the performance characteristic includes at least one of a voltage of the heater, a current of the heater, and the temperature of the heater.

6. The method of claim 1 further comprising determining whether the temperature of the heater is less than the first setpoint variable, wherein:
   in response to the temperature of the heater being less than the first setpoint variable, the first electrical energy provided to the heater is based on the identified energy profile and is equal to the defined magnitude of initial electrical energy, and
   in response to the temperature of the heater being greater than the first setpoint variable, the method further comprises:
      turning-off electrical energy to the heater; and
      increasing the first electrical energy to the heater to a steady state electrical power in response to the temperature of the heater approaching the first setpoint variable.

7. The method of claim 6, wherein the first electrical energy is increased from zero to the steady state electrical power based on a natural time constant.

8. The method of claim 6, wherein the first electrical energy is increased from zero to the steady state electrical power based on a proportional-integral control.

9. The method of claim 1 further comprising:
   determining whether the temperature of the heater is equal to the first setpoint variable; and
   controlling the first electrical energy to the heater based on a temperature control model for maintaining the temperature of the heater at the first setpoint variable.

10. A system for controlling a heater, the system comprising:
   a non-transitory computer-readable medium; and
   a processor configured to execute instructions stored in the non-transitory computer-readable medium, wherein an execution of the instructions cause the processor to:
      obtain a temperature of the heater and one or more of a first target temperature of the heater or a second target temperature of the heater;
      control the heater in an energy-based control mode based on the temperature and the one or more of the first target temperature of the heater or the second target temperature of the heater;
      identify, during the energy-based control mode, an energy profile for the heater based on the one or more of the first target temperature of the heater or the second target temperature of the heater, wherein the energy profile provides a defined magnitude of initial electrical energy to be applied to the heater to have the temperature reach the one or more of the first target temperature of the heater or the second target temperature of the heater; and
      provide, during the energy-based control mode, first electrical energy to the heater based on the energy profile, wherein the energy profile is based on instructions configured to cause:
         obtainment of a setpoint variable indicating the second target temperature of the heater;
         provision of second electrical energy to the heater, wherein the second electrical energy has a calibration magnitude;
         obtainment of a first process variable indicating a temperature of the heater; and
         when the first process variable indicates that the temperature of the heater is equal to the first target temperature or the second target temperature:
            determination of a response time of the heater;
            selective adjustment of gain values of a controller based on the response time; and
            generation of the energy profile based on the gain values and a first setpoint variable or the gain values and a second setpoint variable, wherein the energy profile correlates the first setpoint variable to a first predetermined value of the first electrical energy or the energy profile correlates the second setpoint variable to a second predetermined value of the second electrical energy.

11. The system of claim 10, wherein the instructions for providing, during the energy-based control mode, the first electrical energy to the heater based on the energy profile further cause the processor to:
   provide the defined magnitude of initial electrical energy to the heater;
   determine whether the temperature of the heater is within a temperature approach band of the one or more of the first target temperature of the heater or the second target temperature of the heater; and
   reduce the first electrical energy provided to the heater to a steady state electrical power in response to the temperature of the heater being within the temperature approach band of the one or more of the first target temperature of the heater or the second target temperature of the heater.

12. The system of claim 10, wherein the execution of the instructions further cause the processor to: selectively provide, during a temperature control mode, the first electrical energy to the heater based on the temperature, and the execution of the instructions that selectively provide the first electrical energy to the heater based on the temperature further cause the processor to:

turn off electrical energy to the heater;

determine whether the temperature of the heater is within a temperature approach band of the one or more of the first target temperature of the heater or the second target temperature of the heater; and increase the electrical energy provided to the heater to a steady state electrical power in response to the temperature of the heater being within the temperature approach band of the one or more of the first target temperature of the heater or the second target temperature of the heater.

13. The system of claim 10, wherein the instructions further comprise:

determining whether the temperature of the heater is equal to the one or more of the first target temperature of the heater or the second target temperature of the heater; and controlling the first electrical energy provided to the heater based on a temperature control model for maintaining the temperature of the heater in response to the temperature of the heater being equal to the one or more of the first target temperature of the heater or the second target temperature of the heater.

14. A method for learning an energy profile of a heater, the method comprising:

obtaining a setpoint variable indicating a target temperature of the heater;

providing electrical energy to the heater, wherein the electrical energy has a calibration magnitude;

obtaining a process variable indicating a temperature of the heater; and when the process variable indicates that the temperature of the heater is equal to the target temperature:

determining a response time of the heater;

selectively adjusting gain values of a controller based on the response time; and generating the energy profile based on the gain values and the setpoint variable, wherein the energy profile correlates the setpoint variable to a predetermined value of electrical energy.

15. The method of claim 14, wherein the energy profile further defines a steady state electrical power that is applied to the heater in response to the temperature of the heater being within a temperature approach band of the target temperature.

16. The method of claim 15 further comprising defining the temperature approach band of the target temperature based on a mathematical model.

17. The method of claim 14, wherein the energy profile further defines a duration of time to provide the predetermined value of electrical energy to the heater to have the temperature of the heater reach the target temperature.

18. The method of claim 14, wherein selectively adjusting the gain values based on the response time further comprises adjusting the gain values based on a Ziegler-Nichols tuning routine in response to the response time being less than a threshold response time.

19. The method of claim 14, wherein the energy profile is further based on the calibration magnitude.

20. The method of claim 14 further comprising selectively adjusting the calibration magnitude when the process variable indicates that the temperature of the heater is equal to the target temperature.

* * * * *